(12) United States Patent
Maeda et al.

(10) Patent No.: US 6,442,125 B1
(45) Date of Patent: Aug. 27, 2002

(54) OPTICAL PICKUP

(75) Inventors: Takanori Maeda; Yoshitsugu Araki; Hajime Koyanagi, all of Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/245,892

(22) Filed: Feb. 8, 1999

(30) Foreign Application Priority Data

Feb. 25, 1998  (JP) ............................................ 10-060554

(51) Int. Cl.[7] ................................................ G11B 7/00
(52) U.S. Cl. .................................. 369/112.1; 369/44.23; 369/44.37; 369/94
(58) Field of Search .............................. 369/112, 44.35, 369/44.23, 44.14, 120, 94, 44.37, 44.25, 112.07, 122.21, 112.01, 112.1; 359/16, 19, 565, 571, 574, 368

(56) References Cited

U.S. PATENT DOCUMENTS

| | | | | |
|---|---|---|---|---|
| 5,619,371 A | * | 4/1997 | Pontius | 359/368 |
| 5,841,746 A | * | 11/1998 | Braat | 369/44.35 |
| 5,862,118 A | * | 1/1999 | Takahashi | 369/112 |
| 5,905,708 A | * | 5/1999 | Richter | 369/112.21 |
| 5,923,632 A | * | 7/1999 | Kato et al. | 369/112.07 |
| 6,055,076 A | * | 4/2000 | Takahashi et al. | 359/16 |
| 6,064,637 A | * | 5/2000 | Ju et al. | 369/44.23 |
| 6,091,690 A | * | 7/2000 | Sano et al. | 369/44.23 |

* cited by examiner

Primary Examiner—William Korzuch
Assistant Examiner—Kim-Kwok Chu
(74) Attorney, Agent, or Firm—Sughrue Mion, PLLC

(57) ABSTRACT

In an optical pickup, the focal position of the reflected light from the information bearing surface where information is to be reproduced and that of the reflected light from other information bearing surfaces are adjusted by an optical device such that the two reflected light components are separated optically.

14 Claims, 7 Drawing Sheets

OPTICAL PICKUP

BACKGROUND OF THE INVENTION

1. Field of the Invention

The present invention relates to an apparatus for reproducing video, audio and other signals that are recorded in optical recording media such as an optical disk. More particularly, the invention relates to an optical pickup which is used to reproduce information from a multi-layer recording medium including alternating half-mirror type and full-mirror type reflective recording layers and which is capable of attenuating the optical noise due to reflection from layers other than where information is being reproduced.

2. Description of the Related Art

A practice recently adopted to increase the recording capacity per surface of an optical disk such as DVD (digital versatile disk) includes forming two recording layers by evaporating a half-mirror type reflective film on the top and a full-mirror type reflective film on the bottom. In a playback mode, a light beam is converged on either one of the information bearing surfaces of the recording layers and the reflected light is detected with a detector, whereupon the signal recorded on that particular information bearing surface is reproduced.

A problem with this method of converging a light beam on one information be aring surfaces is that the reflected light from the other information bearing surface is out of focus when it overlaps the reflected light from said one information bearing surface, thus producing playback noise.

If more than two recording layers are placed in superposition with a view to increasing the recording density, more light is reflected from information bearing surfaces other than where the incident light beam is converged and this further contributes to increased noise. Consider, for example, an optical disk having three equally spaced information bearing surfaces. If a light beam is converged on the information bearing surface which is the remotest from a light source, the light reflected from the intermediate surface will also be converged just on the surface nearest to the light source. Since the light beam converging on the nearest surface has been modulated to high frequency, it will generate particularly great noise.

SUMMARY OF THE INVENTION

The present invention has been accomplished under these circumstances and has as an object providing an optical pickup for reproducing information from a multi-layer recording medium which uses optics for separating the reflected light from one information bearing surface and that from another information bearing surface, thereby ensuring that the crosstalk from information bearing surfaces other than where information is to be recorded is sufficiently attenuated.

The stated object of the invention can be attained by the optical pickup according to a first aspect of the invention which reproduces information by applying a light beam onto one of information recording surfaces formed in a multi-layer recording medium, said optical pickup including a separating means for separating the reflected light from said one information recording surface and the reflected light from another information recording surface which converges in a different position than the first mentioned reflected light and a detector for receiving the reflected light from said one information recording surface as separated by said separating means, the detection output from said detector being used to generate a playback signal.

Thus, the reflected light from the information bearing surface where information is to be reproduced is sufficiently separated from the reflected light from any other information bearing surfaces that a satisfactory playback signal can be obtained that is free of the "crosstalk" component, or the undesired signal component of the reflected light that is contained in the signal component of the reflected light from the information bearing surface where information is being reproduced.

A second aspect of the invention is a modification of the optical pickup according to the first aspect of the invention, wherein said separating means is an astigmatic device that introduces astigmatism into the reflected light from said another information recording surface, said detector being located on the focal line of the reflected light from said another information recording surface.

Thus, the signal component of the reflected light from information bearing surfaces other than the surface where information is to be reproduced is sufficiently converged on the focal line that only the signal component from the information bearing surface where information is being reproduced can be selectively extracted using a simple structural design.

A third aspect of the invention is another modification of the optical pickup according to the first aspect of the invention, which further includes a converging position transforming device by means of which the reflected light from said one information recording surface is allowed to converge on the same plane as the reflected light from said another information recording surface, said detector being located in the position of convergence.

Thus, a converging position transforming device typically composed of a hologram device is used to separate the reflected light from the information bearing surface where information is to be reproduced and the reflected light from other information bearing surfaces and this ensures that only the signal component from the information bearing surface where information is being reproduced and which contains a reduced amount of the signal component from other surfaces is extracted with a simple structural design.

DETAILED DESCRIPTION OF THE PREFERRED EMBODIMENTS

Now, a description will be given in more detail of preferred embodiments of the invention with reference to the accompanying drawings.

FIRST EXAMPLE

Figure 1:
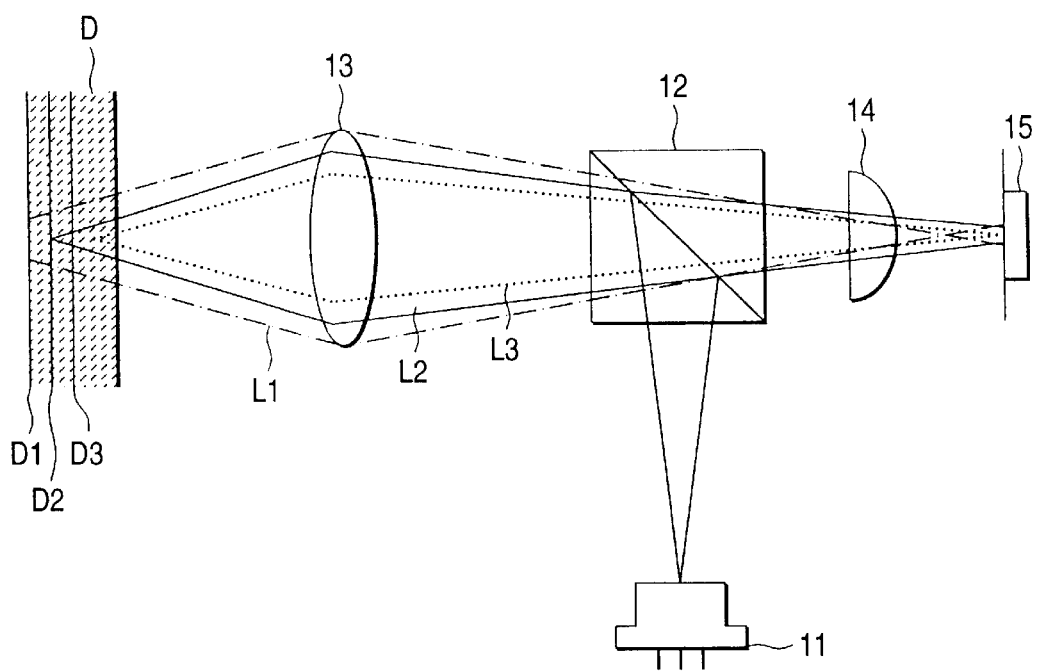
FIG. 1 shows the general layout of an optical pickup according to the first example of the present invention.

FIG. 1 shows the first example of the optical pickup of the invention. As shown, the pickup of the first example comprises a semiconductor laser 11, a beam splitter 12 that splits an ongoing optical path from a return optical path, an objective lens 13, a cylindrical lens 14 that introduces astigmatism into reflected light, and a detector 15. The light beam issuing from the semiconductor laser 11 is converged on either one of the three information bearing surfaces D1, D2 and D3 of a multi-layer optical disk D. The reflected light is detected with the detector 15 to reproduce the recorded information. The optical disk D has a multi-layered structure consisting of three information bearing surfaces, the first surface D1 coated with an aluminum full-mirror film, and the second and third surfaces D2 and D3 which are typically coated with a gold half-mirror film.

Figure 2:
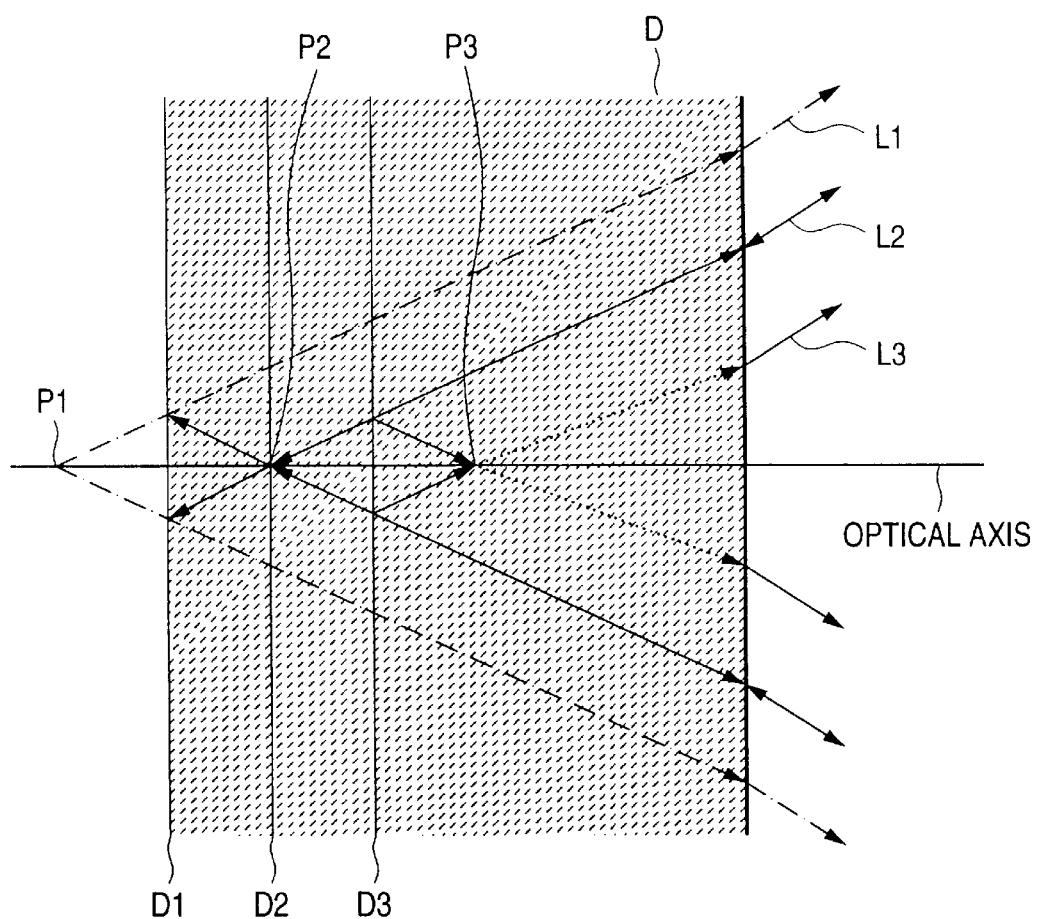
FIG. 2 show how a light beam incident on the optical disk is reflected by information bearing surfaces.

FIG. 2 illustrates how the light beam from the pickup of the stated construction is converged on the optical disk D, particularly on the second information bearing surface D2. The light beam launched into the optical disk D is controlled with a focus servo (not shown) to converge on D2 to form a spot P2 and reflected from D2 to produce a reflected light component L2. In the meantime, the light beam passing through D2 is defocused upon reflection by D1 to produce a reflected component L1 which forms a spot at an imaginary point P1. The light beam also defocused upon reflection by D3 produces a reflected component L3 forming a spot at point P3. Thus, the three reflected light components L1, L2 and L3, when seen from the detector 15, provide three light beams that have a common optical axis but which are focused at different positions.

We now describe the way the optical pickup of the invention uses to separate the three optical beams. First suppose that the cylindrical lens 14 is located between the beam splitter 12 and the detector 15 to intercept the optical paths of reflected light components L1, L2 and L3. The focal length of the cylindrical lens 14 is so set that the reflected light components L1 and L3 form crossed focal lines in a position equidistant from the position where the reflected light component L2 forms a circle of least confusion (the circle formed by the reflected light component L2 at the middle of the two crossed focal lines). The detector 15 is located in a position where the reflected light components L1 and L3 form focal lines and the reflected light component L2 forms a circle of least confusion. Since the cylindrical lens 14 and the detector 15 are thusly located, the reflected light component L2, when the pickup is in focus, forms a circle of least confusion on the detector 15 and the reflected light components L1 and L3 form focal lines in crossed directions.

Figure 3:
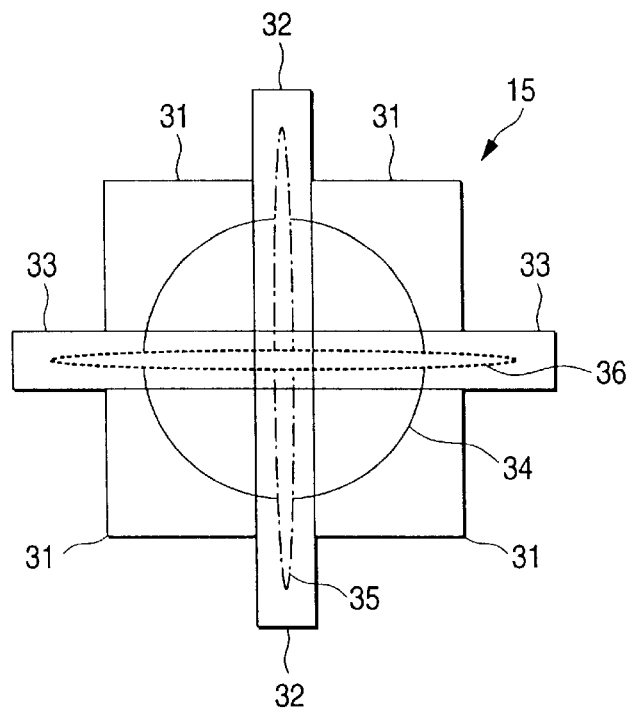
FIG. 3 shows the detector in the optical pickup of the first example.

Let us further discuss the detector 15 with reference to FIG. 3. The detector 15 has a quartered image receiving surface 31 and bisected light receiving surfaces 32 and 33. The light receiving surface 31 is only illuminated with a least circle of confusion 34 formed by the reflected light component L2; the light receiving surface 32 is illuminated with a focal line 35 formed by the reflected light component L1 and part of the least circle of confusion 34; the light receiving surface 33 is illuminated with a focal line 36 formed by the reflected light component L3 and another part of the least circle of confusion 34.

Suppose here that the objective lens 13 has a numerical aperture NA of 0.6, the return optics has a lateral magnification B of 10 and adjacent information bearing surfaces of the optical disk D are spaced by a distance P of 20 $\mu$m. The distance S of two focal lines formed by the reflected light component L2 is calculated as about 4 $\mu$m by equation $S=2\times B\times B\times P$. The radius R of the circle of least confusion 34 is calculated as about 120 $\mu$m by equation $R=S\times NA/B$. If the light beam has a wavelength W of 650 nm, the length V of each of the focal lines 35 and 36 formed by the reflected light components L1 and L2 is calculated as about 480 $\mu$m by equation $V=4\times R$ and their width H is calculated as about 7 $\mu$m by equation $H=1.2\times W/(2\times NA/B)$. For the sake of simplicity, the above calculations disregard the changes in the lateral magnifications of the respective reflected light components due to the spacing P between information bearing surfaces.

Since the width of each of the light receiving surfaces 32 and 33 can be reduced to as small as about 7 $\mu$m, the signal from the circle of least confusion 34 which is only incident on the light receiving surface 31 is sufficient to produce a desirable playback signal. In addition, the light receiving surface 31 does not contain the crosstalk from information bearing surfaces other than the one bearing the information to be reproduced and this contributes to produce a satisfactory playback signal of minimum noise.

Figure 4:
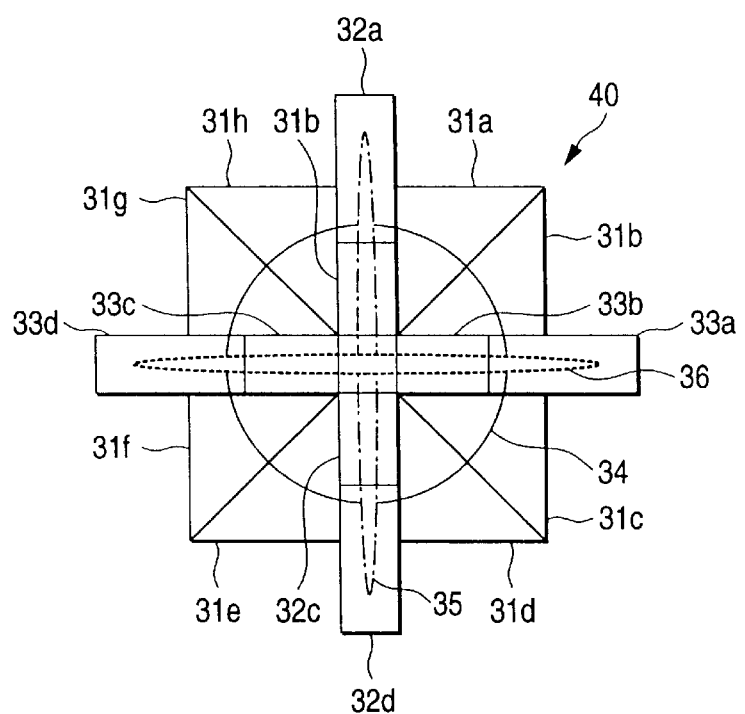
FIG. 4 shows an improved version of the detector in the optical pickup of the first example.

FIG. 4 illustrates how a detector 40 which is an improved version of the detector 15 is used to detect a focus error relying upon the astigmatism introduced by the cylindrical lens 14. As shown, the detector 40 comprises eight octant light receiving surfaces 31a to 31h and two sets of four quadrant light receiving surface 32a to 32d and 33a to 33d. When the optical pickup is in focus, the light receiving surfaces 31a to 31h are only illuminated with the circle of least confusion 34 formed by the reflected light component L2; the light receiving surfaces 32a to 32d are illuminated with the focal line 35 formed by the reflected light component L1 and portions of the circle of least confusion 34; and the light receiving surfaces 33a to 33d are illuminated with the focal line 36 formed by the reflected light L3 and other portions of the circle of least confusion 34.

If the quantities of light received by the respective light receiving surfaces are expressed by the reference numerals for the corresponding light receiving surfaces, the focus error signal FE is determined from the equation $FE=\{(31a+31b)+(31e+31f)\}-\{(31c+31d)+(31g+31h)\}+\{(32b+32c)-(33b+33c)\}-\{X(32a+32d)-Y(33a+33d)\}$ where X and Y are constants that are set to satisfy the relation $(32b+32c)-X(32a+32d)=(33b+33c)-Y(33a+33d)=0$ when the optical pickup is in focus.

The light receiving surfaces 32a, 32d, 33a and 33d of the detector 40 are provided in order to cancel the effects of the focus offset that occurs when information is reproduced from the first information bearing surface D1 which is the farthest away from the detector 40 or from the third information bearing surface D3 which is the closest to the detector 40. Stated more specifically, when information is to be reproduced from the first surface D1, the light receiving surfaces 31a to 31h are illuminated with the reflected light component L1 from D1 whereas the light receiving surfaces 33a to 33d are illuminated with the reflected light component L2 from the second information bearing surface D2 but the light receiving surfaces 32a to 32d are not illuminated with any of the reflected components from the information bearing surfaces D1 to D3. Thus, by satisfying the relation $(33b+33c)-Y(33a+33d)=0$ to ensure that the detection outputs from the light receiving surfaces 33a to 33d are canceled when the optical pickup is in focus, the effect of the focus offset due to the reflected light component L2 can be canceled. Similarly, when information is to be reproduced from the third surface D3, the effect of the focus offset due to the reflected light component L3 can be canceled by satisfying the relation (32b+32c)−X(32a+32d) to ensure that the detection outputs from the light receiving surfaces 32a to 32d are canceled when the optical pickup is in focus. Thus, the stated construction enables the effects of focus offsets to be canceled irrespective of the recording surface from which information is to be reproduced and the correct focus error signals can be produced.

SECOND EXAMPLE

Figure 5:
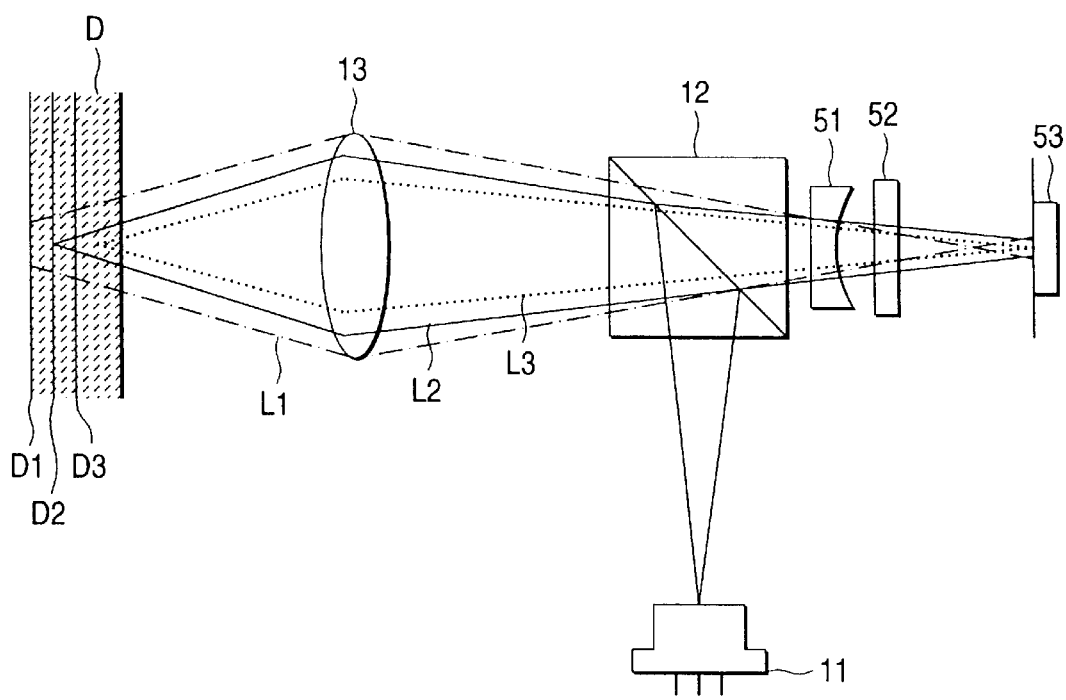
FIG. 5 shows the general layout of an optical pickup according to the second example of the present invention.

The description of the first example is directed to the method by which the crosstalk from an information bearing surfaces adjacent to the one from which information is to be reproduced is removed or attenuated by introducing astigmatism to reflected light components. The same effect can be attained by a non-astigmatic method. FIG. 5 shows the second example of the optical pickup of the present invention. As shown, the pickup of the second example comprises a semiconductor laser 11, a beam splitter 12 that splits an ongoing optical path from a return optical path, an objective lens 13, a concave lens 51 for extending the focal length of reflected light, a hologram device 52 for separating the reflected light into three spots that are defocused in different amounts, and a detector 53. The light beam issuing from the semiconductor laser 11 is converged on either one of the three information bearing surfaces D1, D2 and D3 of a multi-optical disk D having the same multi-layered structure as described in the first example. The reflected light is detected with the detector 53 to reproduce the recorded information. The following description assumes that the light beam is converged on the center information bearing surface D2 for information reproduction.

When the light beam from the pickup of the construction described above is controlled by a focus servo (not shown) to converge on the second information bearing surface D2 of the optical disk D, the incident light beam is reflected from D2 to produce a reflected light component L2. In the meantime, the light beam passing through D2 is defocused upon reflection by D1 to produce a reflected light component L1. The light beam also defocused upon reflection by D3 produces a reflected light component L3. Thus, the three reflected light components L1, L2 and L3, when seen from the detector 43, provide three light beams that have a common optical axis but which are focused at different positions.

Figure 6:
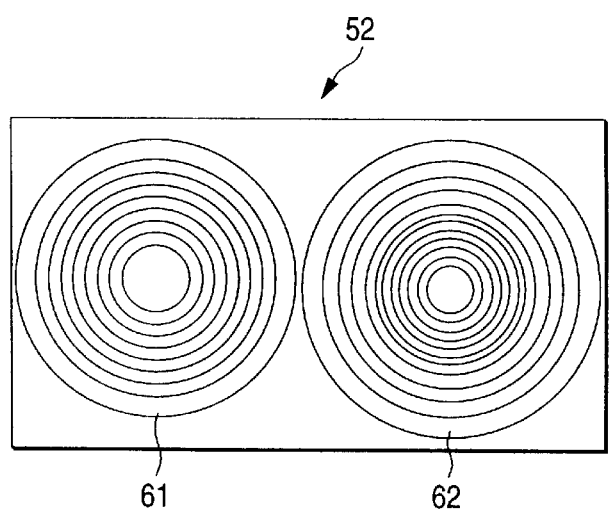
FIG. 6 shows the hologram device in the optical pickup of the second example.
Figure 7:
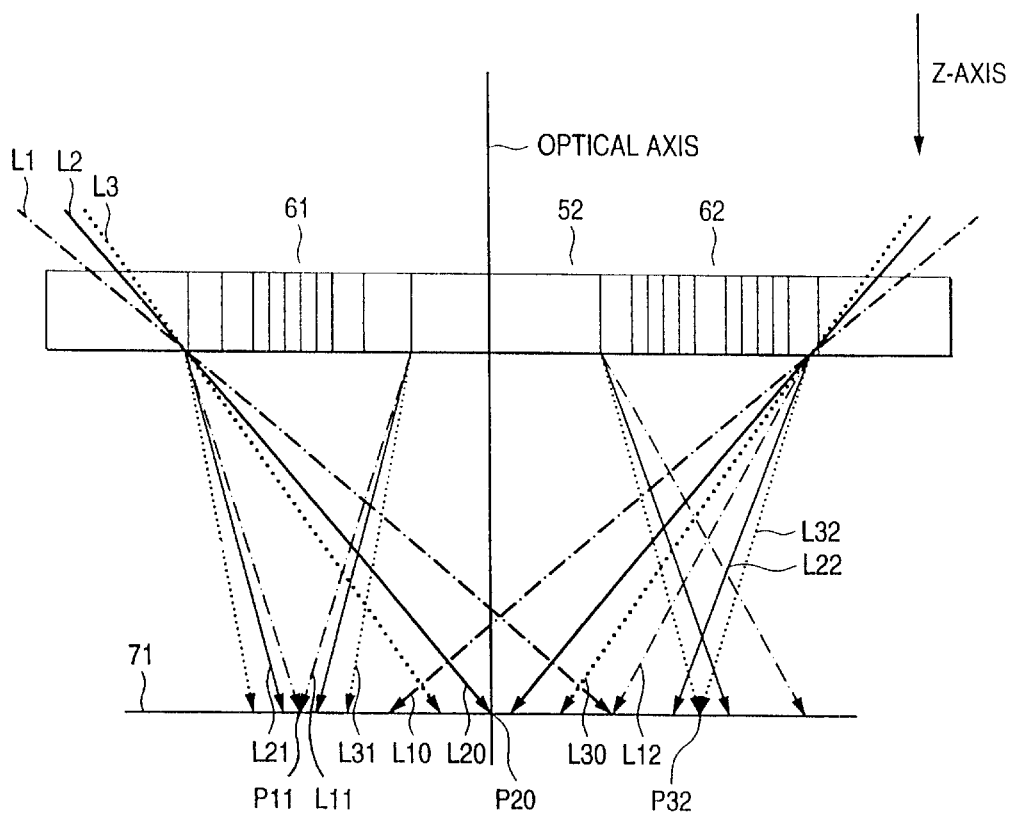
FIG. 7 shows how the optical paths of a light beam incident on the hologram device.
Figure 8:
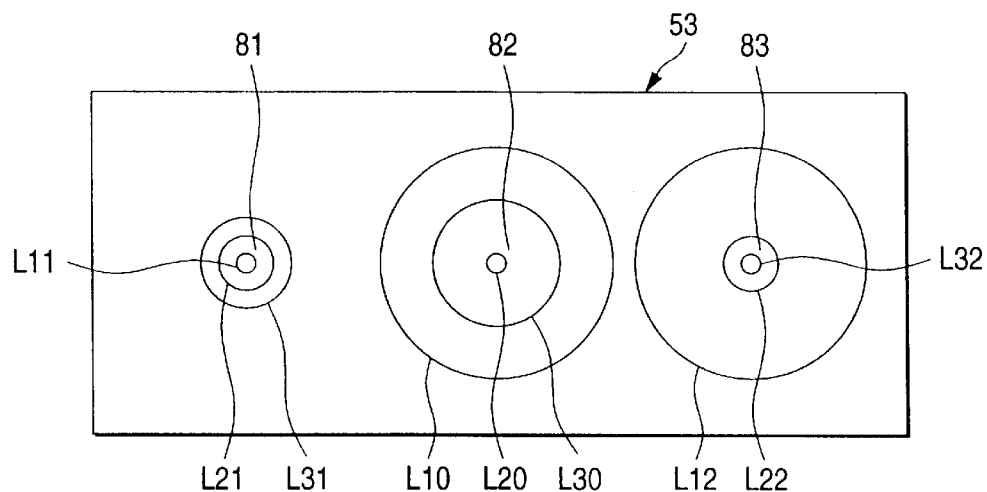
FIG. 8 shows the detector in the optical pickup of the second example.

We now describe the hologram device 2 and the detector 53 in the second example with reference to FIGS. 6 to 8. FIG. 6 shows an exemplary pattern of the hologram device 52; FIG. 7 shows how the hologram device 52 acts on the reflected light; FIG. 8 shows the detector 53.

As shown in FIG. 6, the hologram device 52 has two diffraction lenses 61 and 62 of different powers that are offset in position with respect to the optical axis. The diffraction lens 61 works as a concave lens and the diffraction lens 62 as a convex lens. Assume that the reflected light components L1, L2 and L3 from the optical disk D are incident on the hologram device 52 in the direction of arrow Z as shown in FIG. 7. The hologram device 52 separates each of the reflected light components as follows: L1 is separated into the zeroth-order light L10, the first-order light L11 produced by the diffraction lens 61 and the reflected light L12 produced by the diffraction lens 62; L2 is separated into the zeroth-order light L20, the first-order light L21 produced by the diffraction lens 61 and the reflected light L22 produced by the diffraction lens 62; D3 is separated into the zeroth-order light L30, the first-order light L31 produced by the diffraction lens 61 and the reflected light L32 produced by the diffraction lens 62. It should be noted that when the optical pickup is in focus, the diffraction lens 61 causes the first-order light L11 to be focused on a line segment 71 that passes through the focal position P20 of the zeroth-order light L20 and which is perpendicular to the optical axis and, similarly, the diffraction lens 62 causes the first-order light L32 to focused on the same line segment. The detector 53 is located in a plane that passes through the line segment 71 and which is perpendicular to the optical axis.

In the present discussion, the diffraction lenses 61 and 62 are assumed to work as a concave lens and a convex lens, respectively. However, this is not the sole case of the invention and considering the ease in design of the hologram device, both diffraction lenses may be adapted to work either as a convex lens or as a concave lens. In this alternative case, the reflected light L2 is converged on the detector by means of one diffraction lens and the reflected light L1 or L3 is converged on the detector by means of the other diffraction lens whereas the reflected light L3 or L1 is converged by the zeroth-order light.

As shown in FIG. 8, a group of zeroth-order light components L10, L20 and L30, a group of first-order light components L11, L21 and L31 produced by the diffraction lens 61 and a group of first-order light components L12, L22 and L32 produced by the diffraction lens 62 are incident on the detector 53 to form concentric circles at different positions. The detector 53 has three light receiving surfaces 81, 82 and 83 such that only the center circle is effective in light reception and the other circles are masked.

The light receiving surface 81 is illuminated with the three overlapping first-order light components L11, L21 and L31 produced by the diffraction lens 61, provided that L11 is convergent but L21 and L31 are diffusing. Similarly, the light receiving surface 82 is illuminated with three overlapping zero-order light components L10, L20 and L30, provided that L20 is convergent but L20 and L30 are diffusing. The light receiving surface 83 is illuminated with three overlapping first-order light components L12, L22 nd L32 produced by the diffraction lens 62, provided that L32 is convergent but L12 and L22 are diffusing. Since light is attenuated in proportion to the area of illumination, an extremely high proportion of the light incident on the light receiving surface 81 is occupied by the first-order light L11 and similarly very high proportions of the light receiving surfaces 82 and 83 are occupied by the zeroth-order light L10 and the first-order light L32, respectively.

If the quantities of light received by the respective light receiving surfaces are expressed by the reference numerals n for the corresponding light receiving surfaces with the symbol T attached thereto, the playback signal RF can be extracted by the equation RF=T82−(J×T81+K×T83), wherein J and K are constants. Constant J is so set that the product of J and T81 is equal to the quantity of the zeroth-order light L10 contained in T82 and constant K is so set that the product of K and T83 is equal to the quantity of the zeroth-order light L30 contained in T82.

Thus, by performing calculations on the extracted quantities of the light components incident on the centers of the three sets of concentric circles, a playback signal can be extracted in such a way that the crosstalk component from the recording surfaces that are adjacent to the surface where the recorded information is to be reproduced is sufficiently attenuated.

THIRD EXAMPLE

The first and second examples assume removing the crosstalk from the two information bearing surfaces that are adjacent to the surface where the recorded information is to be reproduced. This is not the sole case of the invention and the two examples may be applied in such a way as to remove the crosstalk from more than two information bearing surfaces.

Figure 9:
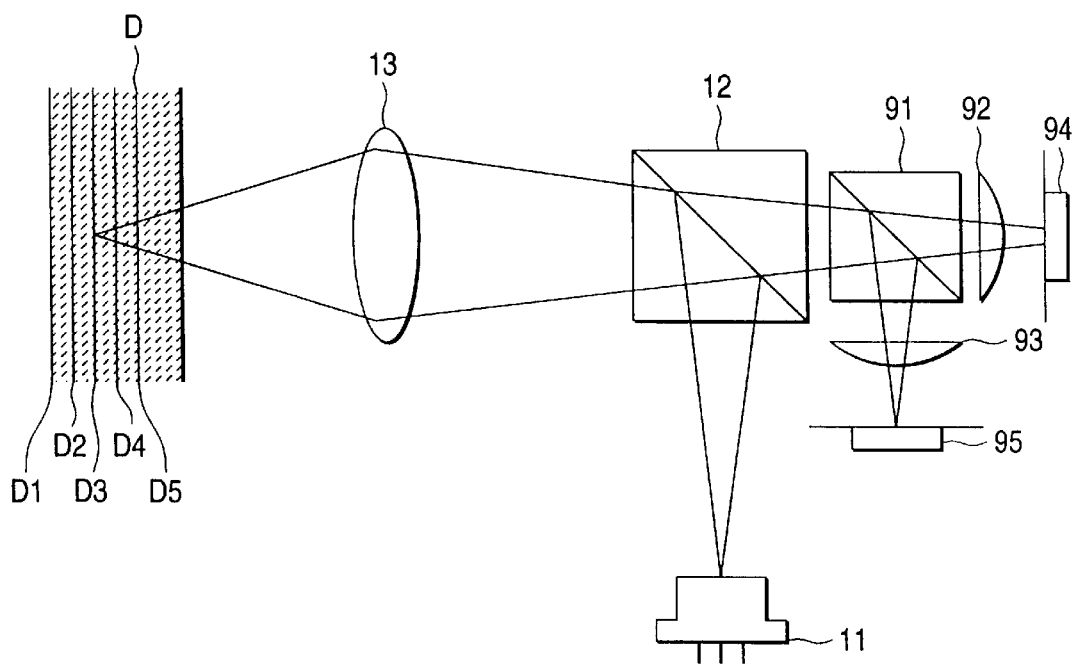
FIG. 9 shows the general layout of an optical pickup according to the third example of the present invention.

FIG. 9 shows the third example of the optical pickup of the present invention. As shown, the pickup of the third example comprises a semiconductor laser 11, a beam splitter 12 for splitting an ongoing optical path from a return optical path, an objective lens 13, a second beam splitter 91 for separating the reflected light from an optical disk D into two components, a first and a second cylindrical lens 92 and 93 for introducing astigmatism into the separated components of the reflected light, and detectors 94 and 95 for detecting the separated components of the reflected light. The light beam issuing from the semiconductor laser 11 is converged on either one of the five information bearing surfaces D1, D2, D3, D4 and D5 of the multi-layer optical disk D having the same multi-layered structure as described in the first example. The reflected light is detected with the detectors 94 and 95 to reproduce the recorded information. The following description assumes that the light beam is converged on the center information bearing surface D3 for information reproduction.

Since the optical disk D used in the third example has five information bearing surfaces, the number of light components that are reflected from the disk D is five which is greater than the number of reflected light components in the first and second examples by two. These five reflected light components are separated by the second beam splitter 91. The reflected light components passing through the second beam splitter 91 are processed by the first cylindrical lens 92 in the same manner as in the first example such that the reflected light components from the information bearing surfaces D2 and D4 form focal lines in a position equidistant from the position where the reflected light component from the information bearing surface D3 forms a circle of least confusion. The light components reflected by the second beam splitter 91 are processed by the second cylindrical lens 93 that introduces twice as much astigmatism as is introduced by the first cylindrical lens 92 such that the reflected light components from the information bearing surfaces D1 and D5 form focal lines in a position equidistant from the position where the reflected light component from D3 forms a circle of least confusion.

Figure 10A:
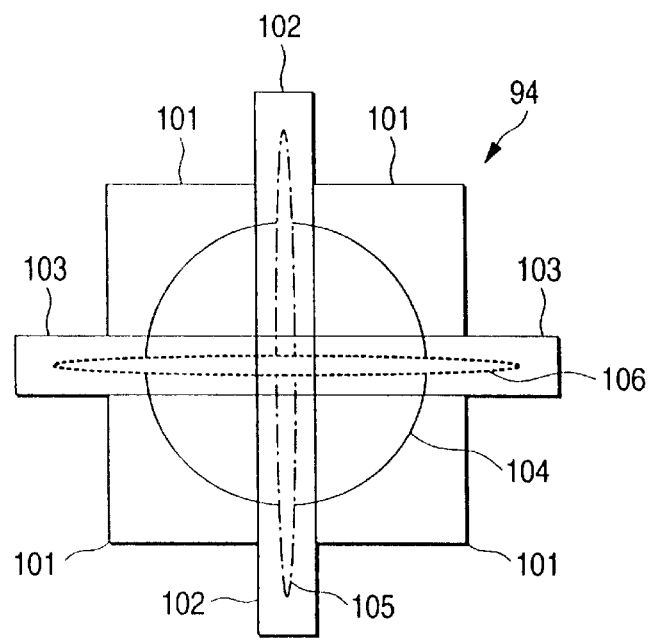
FIG. 10 shows the two detectors in the optical pickup of the third example.
Figure 10B:
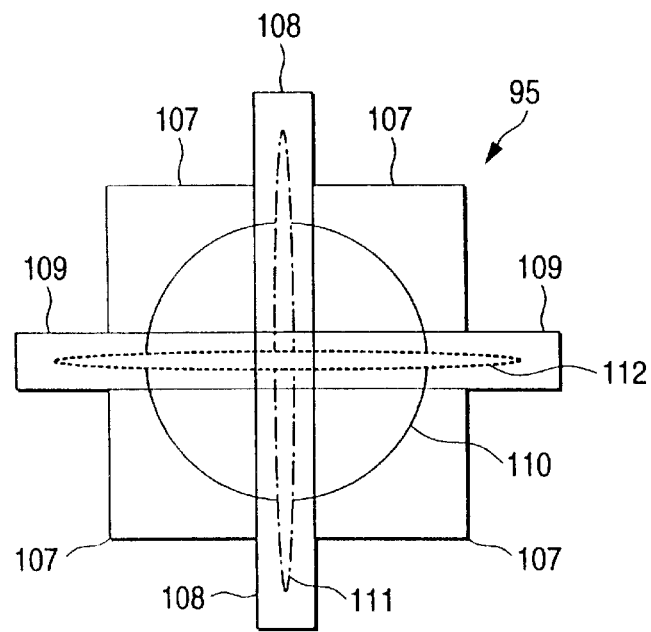

Let us now describe the detectors 94 and 95 with reference to FIG. 10. The detector 94 comprises a quartered light receiving surface 101 and bisected light receiving surfaces 102 and 103. The light receiving surface 101 is illuminated with the circle of least confusion 104 formed by the reflected light from D3; the light receiving surface 102 is illuminated with the focal line 105 formed by the reflected light from D2 and part of the circle of least confusion 104; the light receiving surface 103 is illuminated with the focal line 106 formed by the reflected light from D4 and another part of the circle of least confusion 104. The detector 95 comprises a quartered light receiving surface 107 and bisected light receiving surfaces 108 and 109. The light receiving surface 107 is illuminated with the circle of least confusion 110 formed by the reflected light from D3; the light receiving surface 108 is illuminated with the focal line 111 formed by the reflected light from D1 and part of the circle of least confusion 110; the light receiving surface 109 is illuminated with the focal line 112 formed by the reflected light from D5 and another part of the circle of least confusion 110.

The light receiving surface 101 is also illuminated with small amounts of the reflected light from D1 and D5 in a defocused state. Similarly, the light receiving surface 107 is also illuminated with small amounts of the reflected light from D2 and D4 in a defocused state. Let us now describe the method of extracting a playback signal in which these small amounts of crosstalk components have been sufficiently attenuated. If the quantities of light received by the respective light receiving surfaces are expressed by the reference numerals n for the corresponding light receiving surfaces with the symbol T attached thereto, the playback signal RF can be extracted by the equation RF=(T101+T107)−(M×T102+N×T103+O×T108+Q×T109), where M, N, O and Q are constants. Constant M is so set that the product of M and T102 is equal to the quantity of the reflected light from D2 that is contained in T107; constant N is so set that the product of N and T103 is equal to the quantity of the reflected light from D4 that is contained in T107; constant O is so set that the product of O and T108 is equal to the quantity of the reflected light from D1 that is contained in T101; and constant Q is so set that the product of Q and T109 is equal to the quantity of the reflected light from D5 that is contained in T101.

Thus, by summing up the quantities of the reflected light components from D3 which have been extracted from the detectors 94 and 95 and then subtracting the quantities of reflected light components from D2 and D4 that have been extracted from the detector 94 and the quantities of reflected light components from D1 and D5 and that have been extracted from the detector 95, one can obtain a playback signal from D3 that is free of the crosstalk components from information bearing surfaces D1, D2, D4 and D5.

As described on the foregoing pages, the present invention has the advantage that when reproducing information from a multi-layered optical disk having a plurality of information bearing surfaces, one can obtain a satisfactory playback signal by eliminating the crosstalk components from information bearing surfaces other than the one where information is to be reproduced. In addition, signal pickup is performed in correspondence with the distribution on the detector varying with the difference in position of the surface where information is to be reproduced and, in particular, the effects of two adjacent surfaces are eliminated by taking advantage of astigmatism; this contributes to achieve satisfactory signal reproduction in the presence of reduced crosstalk between layers even from a multi-layered optical disk characterized by a very small spacing between adjacent information bearing surfaces.

What is claimed is:

1. An optical pickup that reproduces information by applying a light beam onto one of information recording surfaces formed in a multi-layer recording medium, said optical pickup comprising:

separating means for separating a first reflected light, which reflects from one information recording surface, and a second reflected light, which reflects from another information recording surface and converges in a different position than the first reflected light, wherein said first reflected light is reflected from a first converged point on said one information recording surface when first information is to be reproduced from said one information recording surface and said second reflected light is reflected from a second converged point on said other information recording surface when second information is to be reproduced from said other information recording surface; and a detector which comprises a first detecting area and a second detecting area, wherein said separating means converges said first reflected light from said one information recording surface on said first detecting area and converges said second reflected light from said other information recording surface on said second detecting area when said first information is to be reproduced, wherein said separating means converges said second reflected light on said first detecting area when said second information is to be reproduced, wherein said detector generates a reproduction signal corresponding to said first information based on an amount of light detected at said first detecting area when said first information is to be reproduced, and wherein said detector generates said reproduction signal corresponding to said second information based on an amount of light detected at said first detecting area when said second information is to be reproduced.

2. The optical pickup according to claim 1, wherein said separating means is an astigmatic device that introduces astigmatism into the second reflected light from said another information recording surface when said first information is to be reproduced, and wherein said detector is located on a focal line of the second reflected light from said another information recording surface.

3. The optical pickup according to claim 1, further comprising:

a converging position transforming device by which the first reflected light from said one information recording surface is allowed to converge on the same plane as the second reflected light from said another information recording surface, said detector being located in the position of convergence.

4. The apparatus according to claim 1, wherein said first detecting area does not detect said second reflected light from said other information recording surface when said light beam is focused on said one information recording surface.

5. The apparatus according to claim 1, wherein said first reflected light from said one information recording surface is converged on said first detecting area and said second reflected light from said other information recording surface is converged on said second detect area when said light beam is focused on said one information recording surface.

6. The apparatus according to claim 5, wherein said first detecting area does not detect said second reflected light when said light beam is focused on said one information recording surface.

7. An apparatus for reproducing information, comprising:

a separating device which separates a first reflected light from a first information recording surface of a multi-layer recording medium and a second reflected light from a second information recording surface of said multi-layer recording medium; and a detector which detects said first reflected light at a first detection area and detects said second reflected light at a second detection area when said first information recording surface is a target information recording surface to be reproduced, wherein an output from said first detection area is used to reproduce information contained in said first information recording surface when said first information recording surface is said target information recording surface to be reproduced, wherein said detector detects said second reflected light at said first detection area when said second information recording surface is said target information recording surface to be reproduced, and wherein said output from said first detection area is used to reproduce information contained in said second information recording surface when said second information recording surface is said target information recording surface to be reproduced.

8. The apparatus according to claim 7, further comprising:

a focusing device that selectively focuses a light beam on said multi-layer recording medium to produce said first reflected light and said second reflected light, wherein said first detection area does not detect said second reflected light when said light beam is focused on said first information recording surface.

9. The apparatus according to claim 8, wherein said separating device introduces astigmatism into said second reflected light when said light beam is focused on said first information recording surface, and wherein said second reflected light converges on said second detection area as a focal line when said light beam is focused on said first information recording surface.

10. The apparatus according to claim 9, wherein a shape of said second detection area corresponds to a shape of said focal line.

11. The apparatus according to claim 7, further comprising:

a focusing device that selectively focuses a light beam on said multi-layer recording medium to produce said first reflected light and said second reflected light, wherein said separating device introduces astigmatism into said second reflected light when said light beam is focused on said first information recording surface, and wherein said second reflected light converges on said second detection area as a focal line when said light beam is focused on said first information recording surface.

12. The apparatus according to claim 11, wherein a shape of said second detection area corresponds to a shape of said focal line.

13. The apparatus according to claim 7, wherein said separating device is a hologram device, wherein said hologram device separates said first reflected light into at least a first zeroth-order light and a first first-order light, wherein said hologram device separates said second reflected light into at least a second zeroth-order light and a second first-order light, wherein said first zeroth-order light is converged on said first detection area and said second zeroth-order light is converged on said second detection area.

14. The apparatus according to claim 13, further comprising:

a focusing device that selectively focuses a light beam on said multi-layer recording medium to produce said first reflected light and said second reflected light, wherein said first zeroth-order light is converged on said first detection area and said second zeroth-order light is converged on said second detection area when said light beam is focused on said first information recording surface.

* * * * *